(12) United States Patent
Liu et al.

(10) Patent No.: US 12,584,832 B2
(45) Date of Patent: Mar. 24, 2026

(54) LOW-ENERGY CONSUMPTION SOLVENT DILUTION DEVICE FOR PRE-TREATING SAMPLE

(71) Applicant: Freshwater Fisheries Research Institute of Jiangsu Province, Nanjing (CN)

(72) Inventors: Yanshan Liu, Nanjing (CN); Tongqing Zhang, Nanjing (CN); Shengkai Tang, Nanjing (CN); Daming Li, Nanjing (CN); Xiaowei Liu, Nanjing (CN); Xiankun Gu, Nanjing (CN); Dongdong Shen, Nanjing (CN)

(73) Assignee: Freshwater Fisheries Research Institute of Jiangsu Province, Nanjing (CN)

( * ) Notice: Subject to any disclaimer, the term of this patent is extended or adjusted under 35 U.S.C. 154(b) by 921 days.

(21) Appl. No.: 17/311,356

(22) PCT Filed: Nov. 10, 2020

(86) PCT No.: PCT/CN2020/127871
§ 371 (c)(1),
(2) Date: Aug. 9, 2022

(87) PCT Pub. No.: WO2021/135656
PCT Pub. Date: Jul. 8, 2021

(65) Prior Publication Data
US 2022/0364962 A1 Nov. 17, 2022

(30) Foreign Application Priority Data
Dec. 31, 2019 (CN) .......................... 201911417536.2

(51) Int. Cl.
*G01N 1/38* (2006.01)
*B01F 23/40* (2022.01)
(Continued)

(52) U.S. Cl.
CPC ............. *G01N 1/38* (2013.01); *B01F 23/452* (2022.01); *B01F 23/483* (2022.01); *B01F 23/49* (2022.01);
(Continued)

(58) Field of Classification Search
CPC .. G01N 1/38; G01N 2001/383; B01F 23/483; B01F 23/49; B01F 23/452; B01F 35/189; B01F 2101/23; B08B 3/02; B08B 3/08
See application file for complete search history.

(56) References Cited

U.S. PATENT DOCUMENTS

2008/0087306 A1* 4/2008 Kim ........................ B08B 3/006
134/95.2

FOREIGN PATENT DOCUMENTS

CN 207204722 U 4/2018
CN 207521329 U 6/2018
(Continued)

*Primary Examiner* — Jill A Warden
*Assistant Examiner* — Alex Ramirez
(74) *Attorney, Agent, or Firm* — IDEA Intellectual Limited; Sam T. Yip

(57) ABSTRACT

The invention discloses a low-energy consumption solvent dilution device for pre-treating samples comprising an accommodating unit, the accommodating unit including a case and an accommodating portion arranged inside the case; an input unit, which including an inlet, a second outlet and a third outlet extending into the case; a cleaning unit, which including a receiving assembly arranged below the second outlet and the third outlet, and a conveying assembly communicated with a receiving assembly. The input unit including a first tube connecting with the inlet, and a second tube and a third tube extending out of the second outlet and the third outlet, respectively.

The present invention completes dispensing and diluting the sample fixative in the box, the dispersion of the fixative is reduced. Avoid unnecessary contact for operators. It
(Continued)

improves the safety and accuracy of the experiment, and significantly reduces energy consumption and labor costs.

8 Claims, 6 Drawing Sheets

(51) Int. Cl.
| | |
|---|---|
| *B01F 23/45* | (2022.01) |
| *B01F 35/00* | (2022.01) |
| *B01F 101/23* | (2022.01) |
| *B08B 3/02* | (2006.01) |
| *B08B 3/08* | (2006.01) |

(52) U.S. Cl.
CPC .............. *B01F 35/189* (2022.01); *B08B 3/02* (2013.01); *B08B 3/08* (2013.01); *B01F 2101/23* (2022.01); *G01N 2001/383* (2013.01)

(56) References Cited

FOREIGN PATENT DOCUMENTS

| | | | |
|---|---|---|---|
| CN | 207628801 | U | 7/2018 |
| CN | 108941139 | A | 12/2018 |
| CN | 209174470 | U | 7/2019 |
| CN | 209663850 | U | 11/2019 |
| CN | 111069154 | A | 4/2020 |
| FR | 2962986 | A1 | 1/2012 |
| JP | H09299889 | A | 11/1997 |

* cited by examiner 401a
401a-1
401a-2
402

300
301b
301a
301c
301d 301c-21

LOW-ENERGY CONSUMPTION SOLVENT DILUTION DEVICE FOR PRE-TREATING SAMPLE

FIELD OF THE INVENTION

The invention relates to the technical field of dispensing devices. In particular, it relates to a solvent dilution device for pre-treating samples with low energy consumption.

BACKGROUND OF THE INVENTION

In the fields of biology and medical science, biological samples often need to be fixed with formalin, dimethyl sulfoxide (DMSO), chloroform, iodine solution, Bouin solution, etc. prior to subsequent procedures, such as tissue section analysis, DNA extraction, species identification and so on. These chemicals used to process samples are often toxic and harmful to the human body. However, after the biological sample is fixed and before the subsequent procedures, the fixative and impurities remaining on the surface of the sample need to be cleaned, especially the tissue samples fixed with mixed fixatives which need to be rinsed immediately.

Although the remaining fixatives can be removed by soaking the sample into the water, the processing time is very long, and the water needs to be changed regularly. A high concentration of fixative chemicals will be volatile around the sample, which causes obvious discomfort and even poisoning to the handling staff, leading to serious health impact. These problems need to be solved urgently.

SUMMARY OF THE INVENTION

This section is for the purpose of summarizing some aspects of embodiments of the invention and to briefly introduce some preferred embodiments. In this section, as well as in the abstract and the title of the invention of this application, simplifications or omissions may be made to avoid obscuring the purpose of the section, the abstract and the title, and such simplifications or omissions are not intended to limit the scope of the invention.

The present invention has been made in view of the above-mentioned problems of the conventional solvent diluting device for pre-treating a sample.

Therefore, the present invention aims to provide a low-energy consumption solvent dilution device for pre-treating a sample. It provides an enclosure for removing a solvent from a biological sample and reduces exposure to the toxic solvent in a laboratory environment.

In order to solve the above technical problems, the present invention provides the following technical solutions: a low-energy consumption solvent dilution device for pre-treating sample includes an accommodating unit, where the accommodating unit includes a case and an accommodating portion arranged inside the case, wherein a first outlet and a gas outlet arranged on the case; an input unit, the input unit including an inlet, a second outlet and a third outlet extending into the case; a cleaning unit, the cleaning unit including a receiving assembly arranged below the second outlet and the third outlet, and a conveying assembly communicated with a receiving assembly.

In a preferred embodiment of the low-energy consumption solvent dilution device for pre-treating sample, the input unit includes a first tube communicating with the inlet, and a second tube and a third tube extending out of the second outlet and the third outlet, respectively.

In a preferred embodiment of the low-energy consumption solvent dilution device for pre-treating sample, a fixing element and an elastic element are arranged inside an inner portion of the second tube, where the fixing element is fixed at an inner wall of the second tube; the elastic element is in contact with the fixing element at normal state and forms a first accommodating space together with the second tube.

In a preferred embodiment of the low-energy consumption solvent dilution device for pre-treating sample, the receiving assembly includes a fluid guiding unit, a supporting element with one end connected to the case, an accommodating element, and a fourth outlet communicating with the conveying assembly, where the fluid guiding unit is connected to the supporting element; the supporting element is coaxial with the accommodating element; the accommodating element is arranged inside the supporting element while a relative position thereof to the case remains unchanged.

In a preferred embodiment of the low-energy consumption solvent dilution device for pre-treating sample, at a bottom side of a body wall of the accommodating element there is provided a cableway which opens at a lower end thereof and a pressurizing element, where the cableway is disposed on the pressurizing element and extends to the interior of the pressurizing element.

In a preferred embodiment of the low-energy consumption solvent dilution device for pre-treating sample, the supporting element is provided with a supporting column, a hole, and a second accommodating space connected to the case, where the hole communicates with the accommodating element, and the accommodating element is arranged in the second accommodating space.

In a preferred embodiment of the low-energy consumption solvent dilution device for pre-treating sample, the low-energy consumption solvent dilution device further includes an air blowing unit which has a follower assembly arranged below the third outlet and a gas outlet assembly connected with the follower assembly.

In a preferred embodiment of the low-energy consumption solvent dilution device for pre-treating sample, the follower assembly includes a cam and a follower fixedly connected with the case.

In a preferred embodiment of the low-energy consumption solvent dilution device for pre-treating sample, the case is also provided with a temporary storage pool; the first outlet communicates with the temporary storage pool through an outlet pipe; the gas outlet communicates with a gas outlet pipe, where the gas outlet pipe to the bottom of the temporary storage pool.

In a preferred embodiment of the low-energy consumption solvent dilution device for pre-treating sample, the accommodating portion includes an accommodating plate and a hanging rod, the hanging rod is arranged on an upper part of the accommodating plate, and one end of the accommodating plate is connected to the case and arranged in an inclined manner.

The beneficial effects of the present invention:

By dispensing and diluting the sample fixative in the box, the dispersion of the fixative is reduced. Avoid unnecessary contact for operators. It improves the safety and accuracy of the experiment, and significantly reduces energy consumption and labor costs.

BRIEF DESCRIPTION OF THE DRAWINGS

In order to more clearly illustrate the technical solutions of the embodiments of the present invention, the drawings needed to be used in the description of the embodiments will be briefly introduced below. It is obvious that the drawings in the following description are only some embodiments of the present invention, and it is obvious for those skilled in the art to obtain other drawings based on these drawings without inventive exercise, in which.

DETAILED DESCRIPTION OF THE INVENTION

In order to make the aforementioned objects, features and advantages of the present invention comprehensible, embodiments accompanied with figures are described in detail below.

In the following description, numerous specific details are set forth in order to provide a thorough understanding of the present invention, but the present invention may be practiced in other ways than those specifically described and will be readily apparent to those of ordinary skill in the art without departing from the spirit of the present invention, and therefore the present invention is not limited to the specific embodiments disclosed below.

Furthermore, reference herein to "one embodiment" or "an embodiment" means that a particular feature, structure, or characteristic described in connection with the embodiment is included in at least one implementation of the invention. The appearances of the phrase "in one embodiment" in various places in the specification are not necessarily all referring to the same embodiment, nor are separate or alternative embodiments mutually exclusive of other embodiments.

Furthermore, the present invention is described in detail with reference to the drawings, and in the detailed description of the embodiments of the present invention, the crosssectional view illustrating the structure of the device is not enlarged partially according to the general scale for convenience of illustration, and the drawings are only exemplary and should not be construed as limiting the scope of the present invention. In addition, the three-dimensional dimensions of length, width and depth should be included in the actual fabrication.

EXAMPLES

Example 1

Figure 1:
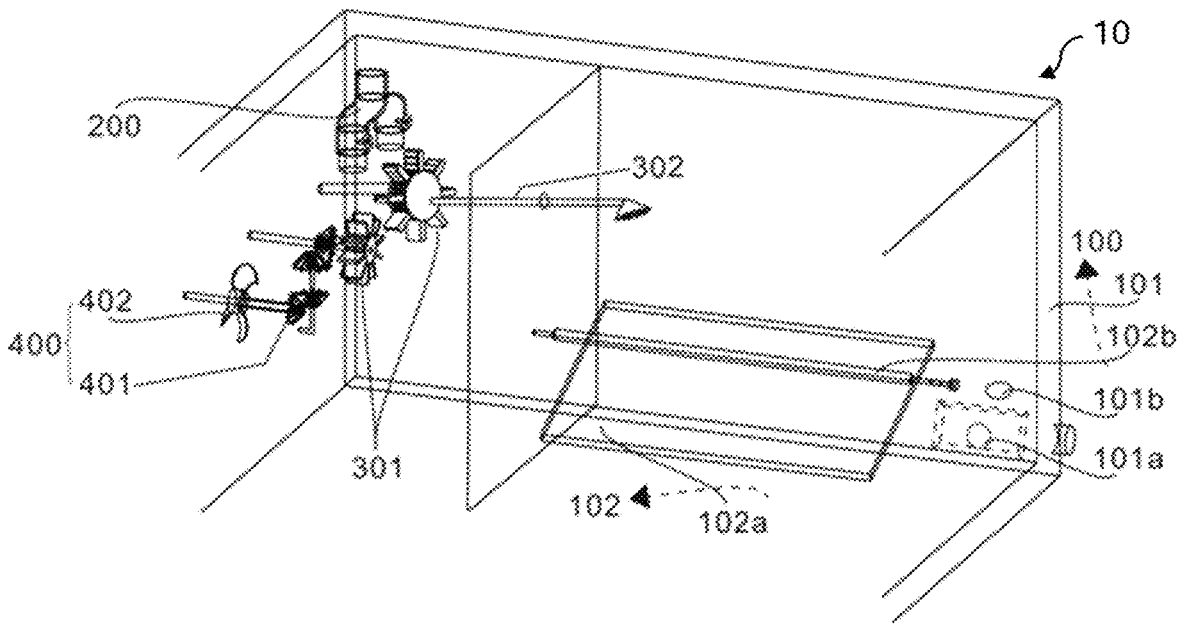
FIG. 1 is a perspective view showing the overall construction of a first embodiment of the solvent dilution device for pre-treating a sample according to the present invention.
Figure 2:
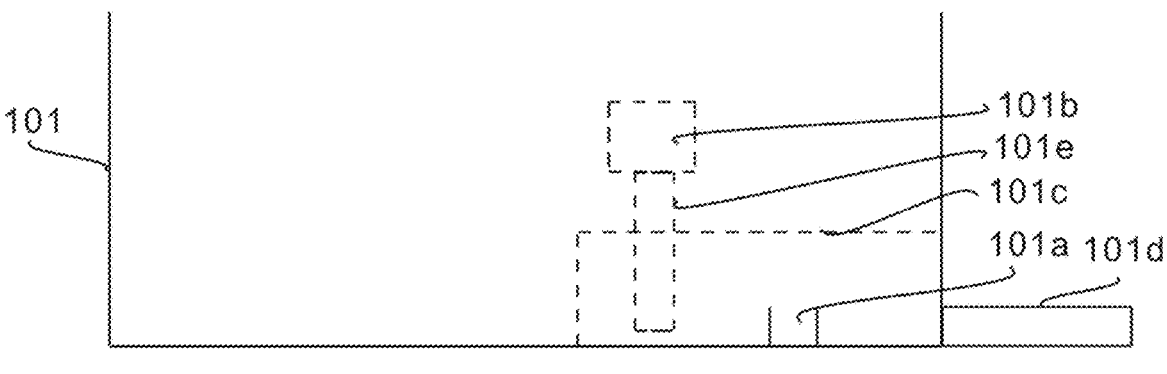
FIG. 2 is a schematic diagram showing the case structure according to the second embodiment of the solvent dilution device for pre-treating a sample according to the present invention.
Figure 3:
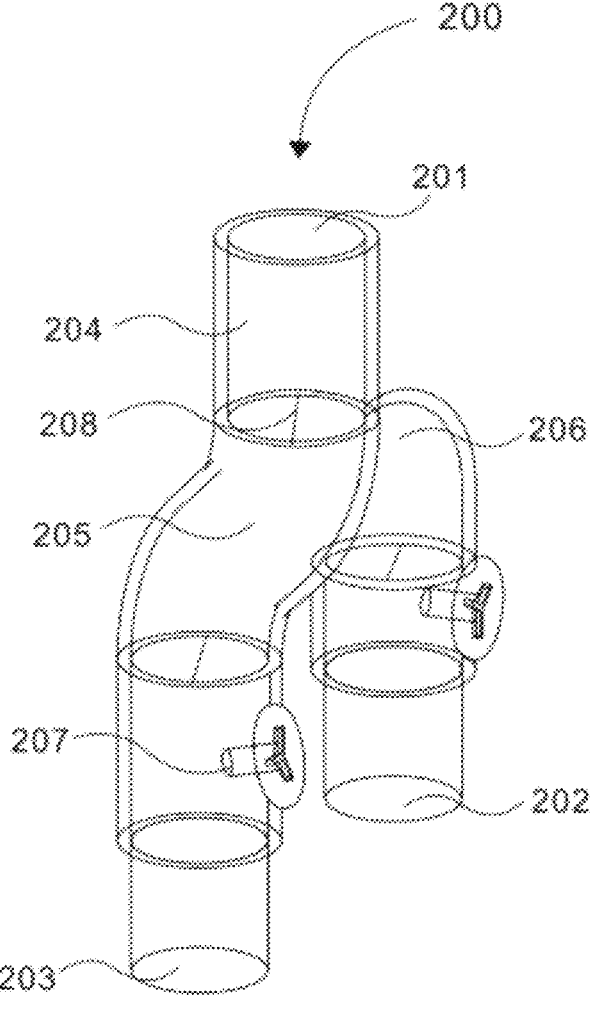
FIG. 3 is a schematic diagram of the flow control part of the second embodiment of the solvent dilution device for pre-treating a sample of the present invention.
Figure 4:
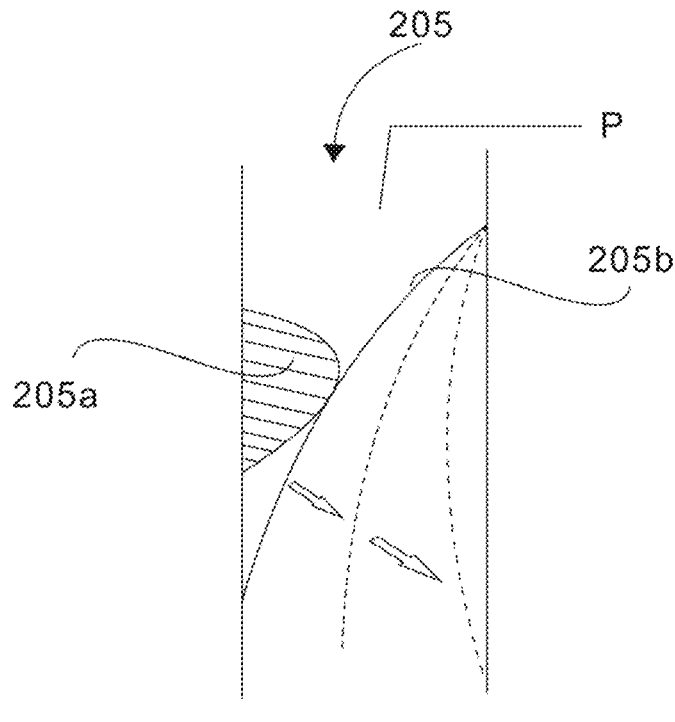
FIG. 4 is a schematic diagram of the structure of the first conveying assembly according to the second embodiment of the solvent dilution device for pre-treating a sample of the present invention.
Figure 5:
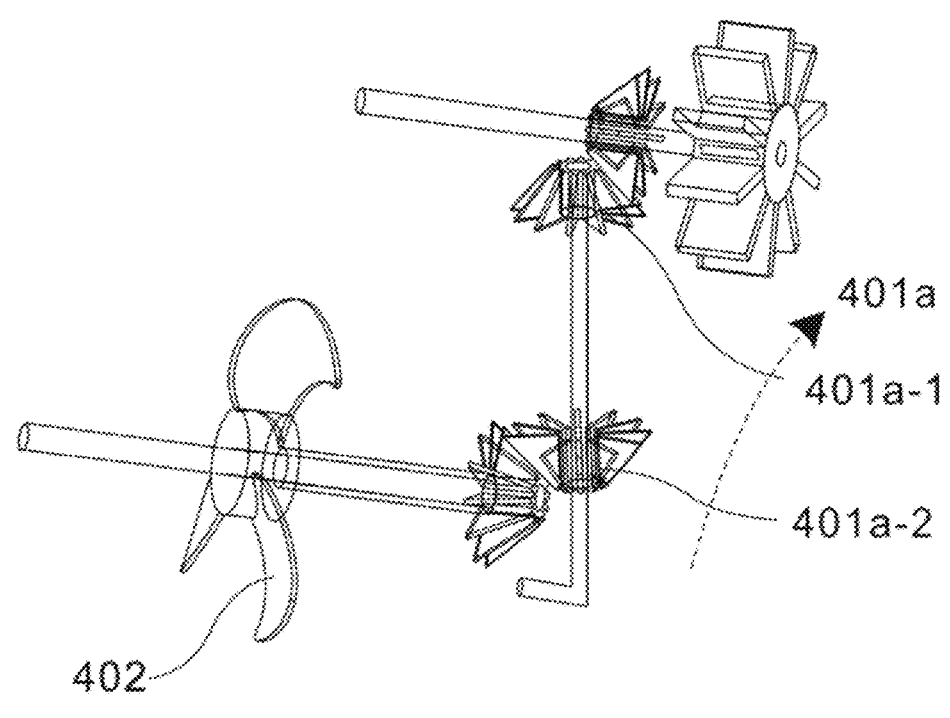
FIG. 5 is a schematic diagram of the follower of the third embodiment of the solvent dilution device for pre-treating a sample of the present invention.
Figure 6:
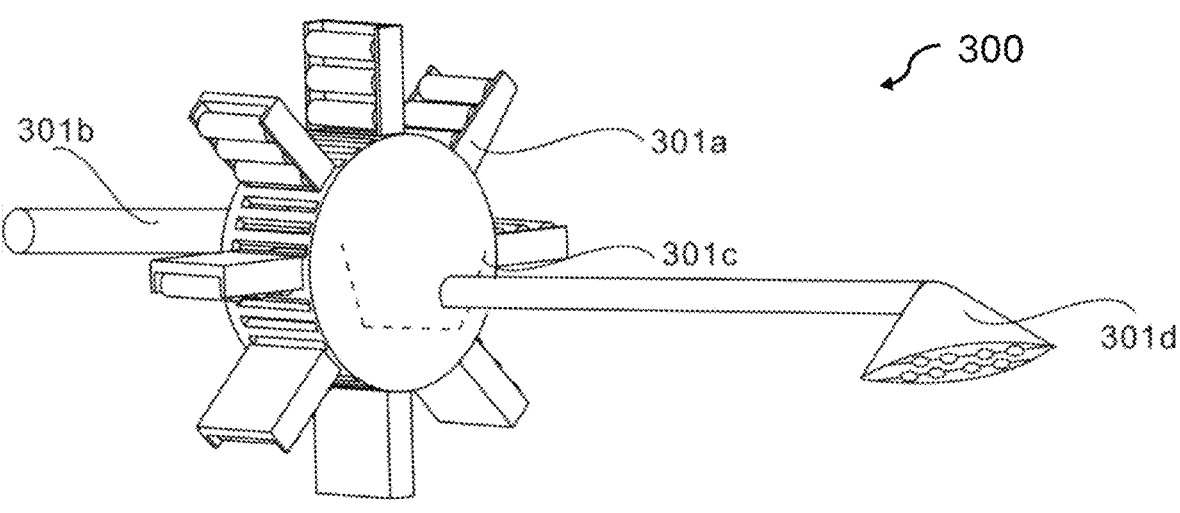
FIG. 6 is a schematic diagram of the structure of the dispersion portion of the fourth embodiment of the solvent dilution device for pre-treating a sample of the present invention.
Figure 7:
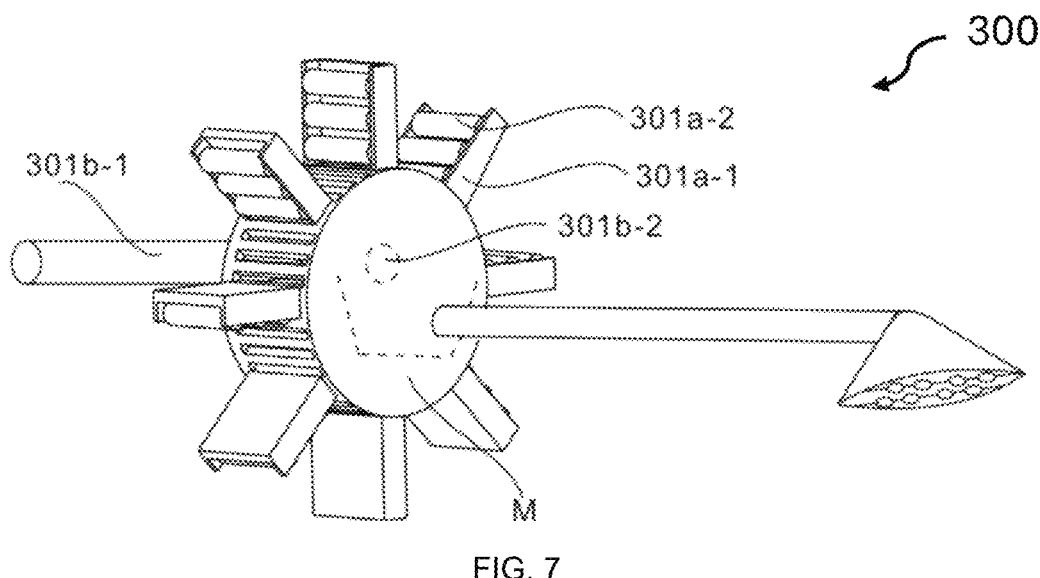
FIG. 7 is a schematic diagram of the structure of the dispersion portion of the fourth embodiment of the solvent dilution device for pre-treating a sample of the present invention.
Figure 8:
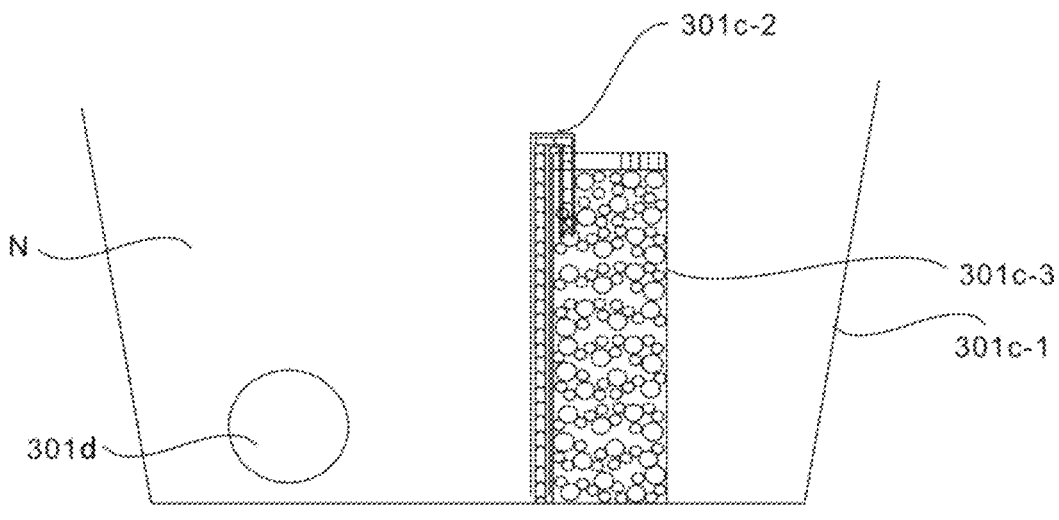
FIG. 8 is a schematic diagram of the structure of the accommodating unit according to the fourth embodiment of the solvent dilution device for pre-treating a sample of the present invention.
Figure 9:
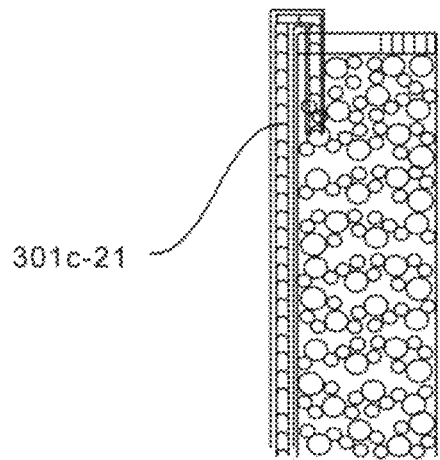
FIG. 9 is a schematic diagram of the structure of an extension unit structure according to the fourth embodiment of the solvent dilution device for pre-treating a sample of the present invention.

Referring to FIGS. 1-2, being the first embodiment of the present invention, a schematic diagram of the overall structure of a solvent dilution device 10 for pre-treating a sample is provided. As shown in FIG. 1, a low-energy consumption solvent dilution device 10 for pre-treating sample is characterized in that: the device 10 includes an accommodating unit 100, the accommodating unit including a case 101 and an accommodating portion 102 arranged inside the case 101, wherein a first outlet 101*a* and a gas outlet 101*b* arranged on the case 101; an input unit 200, the input unit including an inlet 201, a second outlet 202 and a third outlet 203 extending into the case 101; a cleaning unit 300, the cleaning unit including a receiving assembly 301 arranged below the second outlet 202 and the third outlet 203, and a conveying assembly 302 communicated with a receiving assembly 301.

Specifically, the main structure of the present invention includes an accommodating unit 100, an input unit 200 and a cleaning unit 300, which form a container with dilution and dispersion functions. The container can be used for rinsing toxic and harmful substances on a sample, including washing away soaking agents which have pungent odor, cause harm when in contact at high concentration, and lead to serious environmental pollution, so as to reduce the spread of toxic and harmful substances to other places, impact of the soaking agent on the health of researchers, and to ensure the safety of research and testing.

The accommodating unit 100 is a framework of the dispensing container, the accommodating unit including a case 101 and an accommodating portion 102 arranged inside the case 101, wherein a first outlet 101*a* and a gas outlet 101*b* arranged on the case 101. The communication between the inside and the outside of the dispensing device is achieved, which provides a guarantee for introducing a dispensing agent into the container. The accommodating portion 102 is used to place a biological sample. Further, the accommodating portion 102 includes an accommodating plate 102*a* and a hanging rod 102*b* arranged on the upper part of the accommodating plate 102*a*. The accommodating plate 102*a* can accommodate larger samples to be washed, such as fish specimen. The hanging rod 102*b* is used to hang items that cannot be stored, such as small and light benthic organism samples (Nereis, etc.) to prevent them from being washed away by the dispensing agent. When in use, this type of sample can be hung on the accommodating portion 102 through a mesh bag for washing. Preferably, the accommodating plate 102*a* is connected to the case 101 on one side and arranged in an inclined manner, which facilitates the flow of the dispensing agent, reduces the accumulation of the dispensing agent at the vortex formed by the contact between the sample and the dispensing agent during the rinsing process, thereby facilitates the discharge thereof.

The input unit 200 is a motion generating device of the dispensing container including a first tube 204 communicating with the inlet 201, and a second tube 205 and a third tube 206 extending out of the second outlet 202 and the third outlet 203, respectively so that continuous media or discontinuous media for dispensing or scouring can be introduced, such as water, acid-based dispensing liquid, buffer solution, ionic liquid catalyst, degradation agent and other liquids, or fine sand and other nucleating agents, salt particle and other coating agents, or nanometer-sized catalyst degradation agents and other micro particles.

The cleaning unit 300 is the dispensing component of the dispensing container. The cleaning unit including a receiving assembly 301 arranged below the second outlet 202 and the third outlet 203, and a conveying assembly 302 communicated with a receiving assembly 301. The receiving assembly 301 is used to accurately receive the dispensing agent, and then the dispensing agent is sent out through the conveying assembly 302 to achieve the dispensing treatment of the sample.

Furthermore, the case 101 is also provided with a temporary storage pool 101c, the first outlet 101a is in communication with the temporary storage pool 101c through the output pipe 101d, the gas outlet 101b connecting to the gas outlet pipe 101e, the gas outlet pipe 101e extends into the bottom of the temporary storage pool 101c, which plays a role in ventilating and removing the dispensing agent. Specifically, the first outlet 101a is connected with the temporary storage pool 101c to temporarily store the used dispensing agent. The temporary storage pool 101c is connected with the outlet pipe 101d to facilitate the discharge of the dispensing agent. The gas outlet 101b is connected with the gas outlet pipe 101e, and the gas outlet pipe 101e extends into the bottom of the temporary storage pool 101c. On one hand, the dispensing agent after dispersion is eliminated, and on the other hand, the soaking agents in the gas exchanged from the case 101 is re-dissolved into the dispensing agent in the temporary storage pool 101c, which increases the content of the soaking agent in the dispensing agent and reduces spillage. Preferably, the temporary storage pool 101c is arranged on the exterior of the case 101 and communicates with the first outlet 101a, and the gas outlet 101b is arranged at the lower part of the case 101, away from the position of a gas outlet assembly 402. Preferably, the first outlet 101a is provided at the bottom of the case 101, the gas outlet 101b is provided at the rear wall of the case 101, and the gas outlet pipe 101e, the output pipe 101d and the temporary storage pool 101c are provided outside the case 101. Furthermore, the gas outlet pipe 101e and the temporary storage pool 101c are arranged on the rear exterior wall of the case 101.

Example 2

Referring to FIGS. 1-4, being the second embodiment of the present invention, the differences between this embodiment and the first embodiment are: the input unit 200 includes a first tube 204 in communication with the inlet 201 and second tube 205 and third tube 206, and a diverter unit 208 and a control unit 207 extending from the second outlet 202 and third outlet 203, respectively. Specifically, referring to FIG. 1, the device includes an accommodating unit 100, the accommodating unit including a case 101 and an accommodating portion 102 arranged inside the case 101, wherein a first outlet 101a and a gas outlet 101b arranged on the case 101; an input unit 200, the input unit including an inlet 201, a second outlet 20 and a third outlet 203 extending into the case 101; a cleaning unit 300, the cleaning unit including a receiving assembly 301 arranged below the second outlet 202 and the third outlet 203, and a conveying assembly 302 communicated with a receiving assembly 301. Specifically, the main structure of the present invention includes an accommodating unit 100, an input unit 200 and a cleaning unit 300, which form a container with dilution and dispersion functions. The container can be used for rinsing toxic and harmful substances on a sample, including washing away soaking agents which have pungent odor, cause harm when in contact at high concentration, and lead to serious environmental pollution, so as to reduce the spread of toxic and harmful substances to other places, impact of the soaking agent on the health of researchers, and to ensure the safety of research and testing.

The input unit 200 includes a first tube 204 communicating with the inlet 201, and a second tube 205 and a third tube 206 extending out of the second outlet 202 and the third outlet 203, respectively, for directional transmission of dispensing agent.

Furthermore, the input unit 200 is also provided with a control unit 207 and a diverting unit 208 to regulate the flow and direction of the dispensing agent. Specifically, the diverting unit 208 is arranged in the input unit 200 to divert the medium flowing through the input unit 200, the control unit 207 is arranged on the input unit 200 to regulate the opening and closing of the input unit 200 and the flow rate of the dispensing agent therein. The input unit 200 penetrates through the case 101 to ensure that the dispensing agent can flow into the container to complete the dispersion of the sample. Preferably, the second tube 205 and the third tube 206 can convey the dispensing agent to the receiving assembly 301 by extension, so as to prevent the dispensing agent from being lost and wasted. If an unconventional dispensing agent is used, the spread and the harm caused thereby can be further reduced. Preferably, the control unit 207 is a water flow control valve, and the diverting unit 208 is a baffle.

Furthermore, the fixing element 205a and an elastic element 205b are arranged inside the inner portion of the second tube 205, the fixing element 205a is fixedly arranged on the inner wall of the second tube 205, and the elastic element 205b is in contact with the fixing element 205a at normal state and forms a first accommodating space P together with the second tube 205. The fixing element 205a has an arc surface, and the elastic element 205b is in contact with the fixing element 205a in a natural state, and forms a first accommodating space P together with the second tube 205 for temporarily storing dispensing agent and storing energy. When the dispensing agent flows in, it will first stay in the first accommodating space P, when the amount of the dispensing agent is sufficient and the pressure is sufficient to cause the elastic element 205b to deform, the first accommodating space P can be opened downwards (for example, move along the arrow direction in FIG. 4). On the one hand, the dispensing agent can be further transported. On the other hand, since the area of the lower gap for opening the first accommodating space P is smaller than the area of the upper part of the second tube 205, the dispensing agent can flow out more quickly. Preferably, the elastic element 205b can be a thin metal sheet made of copper or stainless steel or a plastic sheet with elastic properties. One end of the elastic element is fixedly connected with the inner wall of the second tube 205, such as integral forming, injection molding, welding and the like, and the other end is in a free state. Preferably, when the fixing element 205a and the elastic element 205b are arranged on the same side of the second tube 205, the elastic element 205b is arranged above the fixing element 205a, the elastic element 205b and the second tube 205 together form a first accommodating space P, when the fixing element 205a and the elastic element 205b are arranged on the opposite side of the second tube 205, the elastic element 205*b*, the fixing element 205*a* and the second tube 205 together form the first accommodating space P. When the dispensing agent flows through the inside of the second tube 205, the airflow state in the device will also change significantly. When the dispensing agent is temporarily stored in the first accommodating space P, the device will not provide obvious airflow. At this time, only water flow is injected, and only the dispensing function is exerted. When the dispensing agent flows out in the first accommodating space P, airflow appears inside the device to perform the ventilation function. Finally, when the dispensing agent is stopped being input into the device, the dispensing function of the device is stopped firstly, and the ventilation function is stopped later, so that on one hand, the soaking agent overflowing in the device is fully re-dissolved, on the other hand, the residue of the dispensing agent in the receiving assembly 301 can be reduced, the maintenance of the device is facilitated, and the service life is prolonged.

Example 3

Referring to FIGS. 1-5, being the third embodiment of the present invention, the differences between this embodiment and the preceding embodiments are: the main structure includes an air blowing unit 400, which has a follower assembly 401 arranged below the third outlet 203 and a gas outlet assembly 402 connected with the follower assembly 401. Specifically, referring to FIG. 1, the device includes an accommodating unit 100, the accommodating unit including a case 101 and an accommodating portion 102 arranged inside the case 101, wherein a first outlet 101*a* and a gas outlet 101*b* arranged on the case 101; an input unit 200, the input unit including an inlet 201, a second outlet 20 and a third outlet 203 extending into the case 101; a cleaning unit 300, the cleaning unit including a receiving assembly 301 arranged below the second outlet 202 and the third outlet 203, and a conveying assembly 302 communicated with a receiving assembly 301. Specifically, the main structure of the present invention includes an accommodating unit 100, an input unit 200 and a cleaning unit 300, which form a container with dilution and dispersion functions. The container can be used for rinsing toxic and harmful substances on a sample, including washing away soaking agents which have pungent odor, cause harm when in contact at high concentration, and lead to serious environmental pollution, so as to reduce the spread of toxic and harmful substances to other places, impact of the soaking agent on the health of researchers, and to ensure the safety of research and testing.

The air blowing unit 400 plays a role in promoting the soaking agent to be dissolved into the dispensing agent, reduces the residual of the dispensing agent in the air, and weakens the outward overflow and dispersion tendency. Specifically, the gas outlet assembly 402 is connected with the follower assembly 401. Driven by the follower assembly 401, the gas outlet assembly 402 is prompted to blast air. Preferably, the follower assembly 401 is an impeller, a turbine, etc. Preferably, the position height of the gas outlet assembly 402 is lower than the position height of the follower assembly 401, which facilitates the conversion of the potential energy of the dispensing agent.

Further, after passing through the input unit 200, the dispensing agent falls on the follower assembly 401 to provide power support to the follower assembly 401. The follower assembly 401 includes a first follower assembly 401*a* and a second follower assembly 401*b*, the first follower assembly 401*a* is connected with the receiving assembly

301, the second follower assembly 401*b* is connected with the gas outlet assembly 402, and the first follower assembly 401*a* is connected to the second follower assembly 401*b*. When in use, the dispensing agent falls on the first follower assembly 401*a*, the first follower assembly 401*a* moves and drives the second follower assembly 401*b* to move. In this way, the potential energy of the dispensing agent is converted into potential energy and transmitted, and at the same time, the power support for the receiving assembly 301 and the gas outlet assembly 402 is ensured. Preferably, the first follower assembly 401*a* includes a cam 401*a*-1 and a follower 401*a*-2, and the second follower assembly 401*b* includes a screw follower assembly, a gear follower assembly, etc., to improve the energy transmission efficiency; preferably, the cam 401*a*-1 can receive the dispensing agent and move, thereby driving the follower 401*a*-2 to move, for example, a component with a blade and a runner structure. The follower 401*a*-2 includes a screw follower assembly and a gear follower assembly.

Further, the follower 401*a*-2 and the second follower assembly 401*b* are both gear transmission assemblies, and the size and number of the gears of the two can be set according to actual needs, so that the rotation speed of the gas outlet assembly 402 can be controlled. In this embodiment, the dispensing agent is first used as a power source to provide dispensing power for the container, and then the dispensing agent flows out through the receiving assembly 301 to flush the sample, thereby removing the soaking agent in the sample, so that the dispensing agent plays a very high use value, saves energy and resources.

Example 4

Referring to FIGS. 1-9, this is the fourth embodiment of the present invention. This embodiment is different from the above embodiments in: the receiving assembly 301 including a fluid guiding unit 301*a*, a supporting element 301*b* with one end connected to the case 101, an accommodating element 301*c*, and a fourth outlet 301*d* communicating with the conveying assembly 302, where the fluid guiding unit 301*a* is connected to the supporting element 301*b*, the supporting element 301*b* is coaxial with the axis of the accommodating element 301*c*, the accommodating element 301*c* is arranged inside the supporting element 301*b* while the relative position thereof to the case 101 remains unchanged. Specifically, referring to FIG. 1, the device 10 includes an accommodating unit 100, the accommodating unit including a case 101 and an accommodating portion 102 arranged inside the case 101, wherein a first outlet 101*a* and a gas outlet 101*b* arranged on the case 101; an input unit 200, the input unit including an inlet 201, a second outlet 20 and a third outlet 203 extending into the case 101; a cleaning unit 300, the cleaning unit including a receiving assembly 301 arranged below the second outlet 202 and the third outlet 203, and a conveying assembly 302 communicated with a receiving assembly 301. Specifically, the main structure of the present invention includes an accommodating unit 100, an input unit 200 and a cleaning unit 300, which form a container with dilution and dispersion functions. The container can be used for rinsing toxic and harmful substances on a sample, including washing away soaking agents which have pungent odor, cause harm when in contact at high concentration, and lead to serious environmental pollution, so as to reduce the spread of toxic and harmful substances to other places, impact of the soaking agent on the health of researchers, and to ensure the safety of research and testing.

The receiving assembly 301 includes a fluid guiding unit 301*a*, a supporting element 301*b*, an accommodating element 301*c* and a fourth outlet 301*d*. The fluid guiding unit 301*a* is used to collect the dispensing agent, and the supporting element 301*b* plays a supporting role to ensure the stability of the receiving assembly 301. The accommodating element 301*c* plays the role of holding the dispensing agent, and the fourth outlet 301*d* ensures the dispersion and outflow of the dispensing agent. Specifically, the supporting element 301*b* is connected to the case 101 and connected to the accommodating element 301*c* to ensure stable support for the receiving assembly 301. The fluid guiding unit 301*a* introduces the dispensing agent into the accommodating element 301*c*, the fluid guiding unit 301*a* can exhibit a drainage slope, and the accommodating element 301*c* is in communication with the fourth outlet 301*d*, so as to ensure that the collected dispensing agent can be redistributed and flowed out. The supporting element 301*b* is coaxial with the axis of the accommodating element 301*c*, to ensure that the device is sufficiently stable during operation, and to prevent the accommodating element 301*c* from inclining and falling. At the same time, the accommodating element 301*c* is arranged inside the supporting element 301*b* while the relative position thereof to the case 101 remains unchanged, so that the dispensing agent cannot spill.

Further, the fluid guiding unit 301*a* includes a receiving plate 301*a*-1 and a fluid guiding element 301*a*-2, the receiving plate 301*a*-1 plays a role of buffering. On the one hand, it can accept the input dispensing agent, and on the other hand, it can change the delivery direction of the dispensing agent. The fluid guiding element 301*a*-2 is arranged on the receiving plate 301*a*-1. As the dispensing agent falls into the receiving plate 301*a*-1 during the drainage process, there will be obvious sputtering phenomenon, and the fluid guiding element 301*a*-2 will significantly slow down this phenomenon and ensure the effect of the dispensing agent input into the accommodating element 301*c*. Preferably, the fluid guiding element 301*a*-2 has a curved surface structure to accept the dispensing agent that directly falls and sputters, and its two ends are connected to the two sides of the receiving plate 301*a*-1. Preferably, the fluid guiding element 301*a*-2 has a cylindrical, semi-cylindrical or arc-shaped or semi-arc-shaped structure.

Further, the supporting element 301*b* is provided with a supporting column 301*b*-1, a hole 301*b*-2 and a second accommodating space M. The supporting column 301*b*-1 communicates with the case 101 to ensure the stable support of the supporting element 301*b*. The accommodating element 301*c* is arranged in the second accommodating space M, and is fixedly connected to the supporting element 301*b* to improve the utilization rate of the space. The hole 301*b*-2 communicates with the accommodating element 301*c* to allow the dispensing agent to enter the accommodating element 301*c*. Preferably, the hole 301*b*-2 is provided corresponding to the receiving plate 301*a*-1 and the fluid guiding element 301*a*-2, which facilitates the dispensing agent to enter the accommodating element 301*c*. Preferably, the hole 301*b*-2 is provided at the base of the connection between the receiving plate 301*a*-1 and the fluid guiding element 301*a*-2, so as to maximize the receiving of the dispensing agent.

Further, the accommodating element 301*c* is provided with a third accommodating space N, where the third accommodating space N is in communication with the fourth outlet 301*d* to ensure that the dispensing agent in the accommodating element 301*c* can flow out. Preferably, the bottom surface of the accommodating element 301*c* is arranged in an inclined manner, and the communication between the third accommodating space N and the fourth outlet 301*d* is located at the lowest point, so that the dispensing agent can be completely eliminated. Preferably, the fourth outlet 301*d* is a pipe or shower component with a nozzle structure, and the fourth outlet 301*d* is disposed at the lower part of the third accommodating space N.

Further, at the bottom side of the body wall 301*c*-1 of the accommodating element 301*c* is provided a cableway 301*c*-2 which opens at a lower end thereof and a pressurizing element 301*c*-3, where the cableway 301*c*-2 is disposed on the pressurizing element 301*c*-3 and extends to the interior of the pressurizing element 301*c*-3. The top side of the body wall 301*c*-1 is provided with an opening, and the bottom side is provided with a cableway 301*c*-2 and a pressurizing element 301*c*-3. The cableway 301*c*-2 is attached to the pressurizing element 301*c*-3 and goes deep into the pressurizing element 301*c*-3. The bottom side of the cableway 301*c*-2 is in an open state, and the pressurizing element 301*c*-3 is a closeable box with openings, and pressurizing materials are placed inside. Preferably, the cableway 301*c*-2 is provided with an extension element 301*c*-21 inside, and the extension element 301*c*-21 is placed in contact with the pressurizing material inside the pressurizing element 301*c*-3, and is used to guide the dispensing agent in the body wall 301*c*-1 to the pressurized substance in a small amount to start the pressurization reaction; preferably, when the dispensing agent is water, the extension element 301*c*-21 is a substance or structure that can attract water into the pressurizing element 301*c*-3, such as cotton thread, cotton rope, or a structure with a capillary circuit. The pressurizing substances are calcium oxide, sodium peroxide, etc. The capillary action of the water reacts with the pressurized substance to release heat or gas, which increases the potential energy of the dispensing agent in the body wall 301*c*-1, which facilitates the dispersion of the dispensing agent through the fourth outlet 301*d* and enhances the dispersion effect of the dispensing agent. Preferably, the extension element 301*c*-21 is fixedly arranged at the bottom of the body wall 301*c*-1, and preferably, the extension element 301*c*-21 is fixedly arranged along the inner wall of the cableway 301*c*-2.

Further, the receiving assembly 301 includes a first receiving element fluid guiding unit and a second receiving element supporting element, which play a role of power distribution. Specifically, the first receiving element and the second receiving element are both connected to the case 101, and the case 101 provides support for the first receiving element and the second receiving element. Preferably, the first receiving element and the second receiving element 301*b* are respectively arranged at the positions of the second tube 205 and the third tube 206 directly below, respectively, to ensure that the dispensing agent output from the second tube 205 and the third tube 206 can reach the first receiving element and the second receiving element. On the one hand, the dispensing agent is received, and on the other hand, the potential energy of the dispensing agent is converted into potential energy to provide power for the container. Preferably, the first receiving element and the second receiving element are respectively arranged directly below the second tube 205 and the third tube 206, and the two are arranged directly opposite to each other, which improves the conversion rate of the potential energy of the dispensing agent.

When the pressurized substance pressurizes the dispensing agent by releasing heat, it is completed by the heat conduction between the dispensing agent and the pressurizing element 301*c*-3, when the pressurized substance is pressurized by releasing the gas, the gas generated in the pressurizing element 301*c*-3 passes into the body wall 301*c*-1 along the cableway 301*c*-2 to achieve inflation and pressurization, thereby facilitating the spraying of the dispensing agent.

It should be noted that the above-mentioned embodiments are only for illustrating the technical solutions of the present invention and not for limiting, and although the present invention has been described in detail with reference to the preferred embodiments, it should be understood by those skilled in the art that modifications or equivalent substitutions may be made on the technical solutions of the present invention without departing from the spirit and scope of the technical solutions of the present invention, which should be covered by the claims of the present invention.

What we claim:

1. A solvent dilution device for pre-treating a sample comprising:

an accommodating unit (100), the accommodating unit including a case (101) and an accommodating portion (102) arranged inside the case (101), wherein a first outlet (101*a*) and a gas outlet (101*b*) are arranged on the case (101);

an input unit (200), the input unit including an inlet (201), a second outlet (202) and a third outlet (203) extending into the case (101);

a cleaning unit (300), the cleaning unit including a receiving assembly (301) arranged below the second outlet (202) and the third outlet (203), and a conveying assembly (302) communicated with a receiving assembly (301) and a fourth outlet (301*d*);

wherein the input unit (200) includes a first tube (204) communicating with the inlet (201), a second tube (205) extending out to the second outlet (202), and a third tube (206) extending out to the third outlet (203), respectively; and wherein a fixing element (205*a*) and an elastic element (205*b*) are arranged inside an inner portion of the second tube (205), the fixing element (205*a*) is fixed at an inner wall of the second tube (205), and the elastic element (205*b*) is in contact with the fixing element (205*a*) when at rest and forms a first accommodating space (P) together with the second tube (205).

2. The solvent dilution device for pre-treating the sample of claim 1, wherein the receiving assembly (301) includes a fluid guiding unit (301*a*), a supporting element (301*b*) with one end connected to the case (101), an accommodating element (301*c*), and a fourth outlet (301*d*) communicating with the conveying assembly (302), the fluid guiding unit (301*a*) is connected to the supporting element (301*b*), the supporting element (301*b*) is coaxial with the accommodating element (301*c*), the accommodating element (301*c*) is arranged inside the supporting element (301*b*) while a relative position thereof to the case (101) remains unchanged.

3. The solvent diluting device for pre-treating the sample of claim 2, wherein at the bottom side of a body wall (301*c*-1) of the accommodating element (301*c*) there is provided a cableway (301*c*-2) which opens at a lower end thereof, and a pressurizing element (301*c*-3), where the cableway (301*c*-2) is disposed on the pressurizing element (301*c*-3) and extends to the interior of the pressurizing element (301*c*-3).

4. The solvent dilution device for pre-treating the sample of claim 2, wherein the supporting element (301*b*) is provided with a supporting column (301*b*-1), a hole (301*b*-2), and a second accommodating space (M) connected to the case (101), the hole (301*b*-2) communicates with the accommodating element (301*c*), and the accommodating element (301*c*) is arranged in the second accommodating space (M).

5. The solvent dilution device for pre-treating the sample of claim 1, comprising an air blowing unit (400), which has a follower assembly (401) arranged below the third outlet (203) and a gas outlet assembly (402) connected with the follower assembly (401).

6. The solvent diluting device for pre-treating the sample of claim 5, wherein the follower assembly (401) includes a cam (401*a*-1) and a follower (401*a*-2) fixedly connected with the case (101).

7. The solvent diluting device for pre-treating the sample of claim 1, wherein the case (101) is also provided with a temporary storage pool (101*c*);

the first outlet (101*a*) communicates with the temporary storage pool (101*c*) through an output pipe (101*d*), and a gas outlet (101*b*) communicates with a gas outlet pipe (101*e*), the gas outlet pipe (101*e*) communicates to the bottom of the temporary storage pool (101*c*).

8. The solvent diluting device for pre-treating the sample of claim 1, wherein the accommodating portion (102) includes an accommodating plate (102*a*) and a hanging rod (102*b*), the hanging rod (102*b*) is arranged on an upper part of the accommodating plate (102*a*), and one end of the accommodating plate (102*a*) is connected to the case (101) and arranged in an inclined manner.

\* \* \* \* \*